(12) United States Patent
Mashey

(10) Patent No.: US 6,457,937 B1
(45) Date of Patent: Oct. 1, 2002

(54) FABRICATED TORQUE SHAFT

(75) Inventor: Thomas Charles Mashey, Anderson, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/707,912

(22) Filed: Nov. 8, 2000

(51) Int. Cl.$^7$ ............................................. F01D 17/16
(52) U.S. Cl. ........................................ 415/160; 415/150
(58) Field of Search ............................... 415/160, 159, 415/161, 162, 148, 150, 149.2, 149.4; 464/179

(56) References Cited

U.S. PATENT DOCUMENTS

| | | | | |
|---|---|---|---|---|
| 2,819,732 A | * | 1/1958 | Paetz | 138/46 |
| 3,487,992 A | * | 1/1970 | Pineda | 415/149.4 |
| 3,779,665 A | * | 12/1973 | Tatem et al. | 137/601.05 |
| 3,873,230 A | * | 3/1975 | Norris et al. | 415/149.4 |
| 4,049,360 A | * | 9/1977 | Snell | 415/149.4 |
| 4,400,135 A | * | 8/1983 | Thebert | 415/134 |
| 4,430,043 A | * | 2/1984 | Knight et al. | 415/149.4 |
| 4,618,311 A | * | 10/1986 | Miura et al. | 415/134 |
| 4,856,962 A | * | 8/1989 | McDow | 415/115 |
| 4,890,977 A | * | 1/1990 | Tremaine et al. | 415/150 |
| 5,549,448 A | | 8/1996 | Langston | 415/149.4 |
| 6,174,130 B1 | * | 1/2001 | King et al. | 415/162 |

OTHER PUBLICATIONS

"39$^{th}$ GE Turbine State–of–the–Art Technology Seminar", Tab 1, ""F" Technology —the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA—An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines—Design and Operating Features", M.W. Horner, Aug. 1996.
"39th GE Turbine State–of–the–Art Technology Seminar", Tab 7, "Advance Gas Turbine Materials and Coatings", P.W. Schilke, Aug. 1996.
"39th GE Turbine State–of–the–Art Technology Seminar", Tab 8, "Dry Low NO$_X$ Combustion Systems for GE Heavy–Duty Turbines", L. B. Davis, Aug. 1996.
"39th GE Turbine State–of–the–Art Technology Seminar", Tab 9, "GE Gas Turbine Combustion Flexibility", M. A. Davi, Aug. 1996.
"39th GE Turbine State–of–the–Art Technology Seminar", Tab 10, "Gas Fuel Clean–Up System Design Considerations for GE Heavy–Duty Gas Turbines", C. Wilkes, Aug. 1996.

(List continued on next page.)

Primary Examiner—Edward K. Look
Assistant Examiner—Richard A. Edgar
(74) Attorney, Agent, or Firm—Nixon & Vanderhye PC

(57) ABSTRACT

A fabricated torque shaft is provided that features a bolt-together design to allow vane schedule revisions with minimal hardware cost. The bolt-together design further facilitates on-site vane schedule revisions with parts that are comparatively small. The fabricated torque shaft also accommodates stage schedules that are different one from another in non-linear inter-relationships as well as non-linear schedules for a particular stage of vanes.

20 Claims, 18 Drawing Sheets

OTHER PUBLICATIONS

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines," J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2– Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at Power Gen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.
"Gas, Steam Turbine Work as Single Unit in GE's Advanced H Technology Combined–Cycle System", Press Information, Press Release, 95–NR18, May 16, 1995, Advanced Technology Introduction/pp. 1–3.
"GE Breaks 60% Net Efficiency Barrier" paper, 4 pages.
"GE Businesses Share Technologies and Experts to Develope State–Of–The–Art Products", Press Information, Press Release 95–NR10, May 16, 1995, GE Technology Transfer/pp. 1–3.
"General Electric ATS Program Technical Review, Phase 2 Activities", T. Chance et al., pp. 1–4.
"General Electric's DOE/ATS H Gas Turbine Development" Advanced Turbine Systems Annual Review Meeting, Nov. 7–8, 1996, Washington, D.C., Publication Release.
"H Technology Commercialization", 1998 MarComm Activity Recommendation, Mar., 1998.
"H Technology", Jon Ebacher, VP, Power Gen Technology, May 8, 1998.
"H Testing Process", Jon Ebacher, VP, Power Gen Technology, May 8, 1998.
"Heavy–Duty & Aeroderivative Products" Gas Turbines, Brochure, 1998.
"MS7001H/MS9001H Gas Turbine, gepower.com website for PowerGen Europe" Jun. 1–3 going public Jun. 15, (1995).
"New Steam Cooling System is a Key to 60% Efficiency For GE "H" Technology Combined–Cycle Systems", Press Information, Press Release, 95–NRR16, May 16, 1995, H Technology/pp. 1–3.
"Overview of GE's H Gas Turbine Combined Cycle", Jul. 1, 1995–Dec. 31, 1997.
"Power Systems for the $21^{st}$ Century—"H" Gas Turbine Combined Cycles", Thomas C. Paul et al., Report.
"Power–Gen '96 Europe", Conference Programme, Budapest, Hungary, Jun. 26–28, 1996.
"Power–Gen International", 1998 Show Guide, Dec. 9–11, 1998, Orange County Convention Center, Orlando, Florida.
"Press Coverage following 1995 product announcement"; various newspaper clippings relating to improved generator.
"Proceedings of the Advanced Turbine Systems Annual Program Review Meeting", vol. I, "Industrial Advanced Turbine Systems Program Overview", D.W. Esbeck, p. 3–13, Oct., 1995.
"Proceedings of the Advanced Turbine Systems Annual Program Review Meeting", vol. I, "H Gas Turbine Combined Cysle", J. Corman, p. 14–21, Oct., 1995.
"Proceedings of the Advanced Turbine Systems Annual Program Review Meeting", vol. I, "Overview of Westinghouse's Advanced Turbine Systems Program", Bannister et al., p. 22–30, Oct., 1995.
"Proceedings of the Advanced Turbine Systems Annual Program Review Meeting", vol. I, "Allison Engine ATS Program Technical Review", D. Mukavetz, p. 31–42, Oct., 1995.

"Proceedings of the Advanced Turbine Systems Annual Program Review Meeting", vol. I, "Advanced Turbine Systems Program Industrial System Concept Development", S. Gates, p. 43–63, Oct., 1995.
"Proceedings of the Advanced Turbine Systems Annual Program Review Meeting", vol. I, "Advanced Turbine System Program Phase 2 Cycle Selection", Latcovich, Jr., p. 64–69, Oct., 1995.
"Proceedings of the Advanced Turbine Systems Annual Program Review Meeting", vol. I, "General Electric ATS Program Technical Review Phase 2 Activities", Chance et al., p. 70–74, Oct., 1995.
"Proceedings of the Advanced Turbine Systems Annual Program Review Meeting", vol. I, "Technical Review of Westinghouse's Advanced Turbine Systems Program", Diakunchak et al., p. 75–86, Oct., 1995.
"Proceedings of the Advanced Turbine Systems Annual Program Review Meeting", vol. I, "Advanced Combustion Turbines and Cycles: An EPRI Perspective", Touchton et al., p. 87–88, Oct., 1995.
"Proceedings of the Advanced Turbine Systems Annual Program Review Meeting", vol. I, "Advanced Turbine Systems Annual Program Review", William E. Koop, p. 89–92, Oct., 1995.
"Proceedings of the Advanced Turbine Systems Annual Program Review Meeting", vol. I, "The AGTSR Consortium: An Update", Fant et al., p. 93–102, Oct., 1995.
"Proceedings of the Advanced Turbine Systems Annual Program Review Meeting", vol. I, "Overview of Allison/AGTSR Interactions", Sy A. Ali, p. 103–106, Oct., 1995.
"Proceedings of the Advanced Turbine Systems Annual Program Review Meeting", vol. I, "Design Factors for Stable Lean Premix Combustion", Richards et al., p. 107–113, Oct., 1995.
"Proceedings of the Advanced Turbine Systems Annual Program Review Meeting", vol. I, "Ceramic Stationary as Turbine", M. van Roode, p. 114–147, Oct., 1995.
"Proceedings of the Advanced Turbine Systems Annual Program Review Meeting", vol. I, "DOE/Allison Ceramic Vane Effort", Wenglarz et al., p. 148–151, Oct., 1995.
"Proceedings of the Advanced Turbine Systems Annual Program Review Meeting", vol. I, "Materials/Manufacturing Element of the Advanced Turbine Systems Program", Karnitz et al., p. 152–160, Oct., 1995.
"Proceedings of the Advanced Turbine Systems Annual Program Review Meeting", vol. I, "Land–Based Turbine Casting Initiative", Mueller et al., p. 161–170, Oct., 1995.
"Proceedings of the Advanced Turbine Systems Annual Program Review Meeting", vol. I, "Turbine Airfoil Manufacturing Technology", Kortovich, p. 171–181, Oct., 1995.
"Proceedings of the Advanced Turbine Systems Annual Program Review Meeting", vol. I, "Pratt & Whitney Thermal Barrier Coatings", Bornstein et al., p. 182–193, Oct., 1995.
"Proceedings of the Advanced Turbine Systems Annual Program Review Meeting", vol. I, "Westinhouse Thermal Barrier Coatings", Goedjen et al., p. 194–199, Oct., 1995.
"Proceedings of the Advanced Turbine Systems Annual Program Review Meeting", vol. I, "High Performance Steam Development", Duffy et al., p. 200–220, Oct., 1995.
"Proceedings of the Advanced Turbine Systems Annual Program Review Meeting", vol. II, "Lean Premixed Combustion Stabilized by Radiation Feedback and heterogeneous Catalysis", Dibble et al., p. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. p. 233–248, Oct., 1995.

"Proceedings of the Advanced Turbine Systems Annual Program Review Meeting", vol. II, "Lean Premixed Flames for Low $No_X$ Combustors", Sojka et al., p. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., p. 281–309, Oct., 1995.

"Proceedings of the Advanced Turbine Systems Annual Program Review Meeting", vol. II, "Life Prediction of Advanced Materials for Gas Turbine Application", Zamrik et al., p. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., p. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371–390, Oct., 1995.

"Proceedings of the Advanced Turbine Systems Annual Program Review Meeting", vol. II, "Rotational Effects on Turbine Blade Cooling", Govatzidakia et al., p. 391–392, Oct., 1995.

"Proceedings of the Advanced Turbine Systems Annual Program Review Meeting", vol. II, "Manifold Methods for Methane Combustion", Yang et al., p. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., p. 423–451, Oct., 1995.

"Proceedings of the Advanced Turbine Systems Annual Program Review Meeting", vol. II, "Compatibility of Gas Turbine Materials with Steam Cooling", Desai et al., p. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465–473, Oct., 1995.

"Proceedings of the Advanced Turbine Systems Annual Program Review Meeting", vol. II, Effects of Geometry on Slot–Jet Film Cooling Performance, Hyams et al., p. 474–496 Oct., 1995.

"Proceedings of the Advanced Turbine Systems Annual Program Review Meeting", vol. II, "Steam as Turbine Blade Coolant: Experimental Data Generation", Wilmsen et al., p. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., p. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., p. 529–538, Oct., 1995.

"Proceedings of the Advanced Turbine Systems Annual Program Review Meeting", vol. II, "Bond Strength and Stress Measurements in Thermal Barrier Coatings", Gell et al., p. 539–549, Oct., 1995.

"Proceedings of the Advanced Turbine Systems Annual Program Review Meeting", vol. II, "Active Control of Combustion Instabilities in Low $NO_X$ Gas Turbines", Zinn et al., p. 550–551, Oct., 1995.

"Proceedings of the Advanced Turbine Systems Annual Program Review Meeting", vol. II, "Combustion Instability Modeling and Analysis", Santoro et al., p. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560–565, Oct., 1995.

"Proceedings of the Advanced Turbine Systems Annual Program Review Meeting", vol. II, "Heat Pipe Turbine Vane Cooling", Langston et al., p. 566–572, Oct., 1995.

"Proceedings of the Advanced Turbine Systems Annual Program Review Meeting", vol. II, "Improved Modeling Techniques for Turbomachinery Flow Fields", Lakshminarayana et al., p. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, p. 3–16, Nov., 1996.

"Proceedings of the Advanced Turbine Systems Annual Program Review Meeting", "Power Needs in the Chemical Industry", Keith Davidson, p. 17–26, Nov., 1996.

"Proceedings of the Advanced Turbine Systems Annual Program Review Meeting", "Advanced Turbine Systems Program Overview", David Esbeck, p. 27–34, Nov., 1996.

"Proceedings of the Advanced Turbine Systems Annual Program Review Meeting", "Westinghouse's Advanced Turbine Systems Program", Gerard McQuiggan, p. 35–48, Nov., 1996.

"Proceedings of the Advanced Turbine Systems Annual Program Review Meeting", "Overview of GE's H Gas Turbine Combined Cycle", Cook et al., p. 49–72, Nov., 1996.

"Proceedings of the Advanced Turbine Systems Annual Program Review Meeting", "Allison Advanced Simple Cycle Gas Turbine System", William D. Weisbrod, p. 73–94, Nov., 1996.

"Proceedings of the Advanced Turbine Systems Annual Program Review Meeting", "The AGTSR Industry–University Consortium", Lawrence P. Golan, p. 95–110, Nov., 1996.

"Proceedings of the Advanced Turbine Systems Annual Program Review Meeting", "$NO_X$ and CO Emissions Models for Gas–Fired Lean–Premixed Combustion Turbines", A. Mellor, p. 111–122, Nov., 1996.

"Proceedings of the Advanced Turbine Systems Annual Program Review Meeting", "Methodologies for Active Mixing and Combustion Control", Uri Vandsburger, p. 123–156, Nov., 1996.

"Proceedings of the Advanced Turbine Systems Annual Program Review Meeting", "Combustion Modeling in Advanced Gas Turbine Systems", Paul O. Hedman, p. 157–180, Nov., 19967.

"Proceedings of the Advanced Turbine Systems Annual Program Review Meeting", "Manifold Methods for Methane Combustion", Stephen B. Pope, p. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", Active Control of Combustion Instabilities in Low $NO_X$ Turbines, Ben T. Zinn, p. 253–264, Nov., 1996.

"Proceedings of the Advanced Turbine Systems Annual Program Review Meeting", "Life Prediction of Advanced Materials for Gas Turbine Application," Sam Y. Zamrik, p. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, p. 275–290, Nov., 1996.

"Proceedings of the Advanced Turbine Systems Annual Program Review Meeting", "Compatibility of Gas Turbine Materials with Steam Cooling", Vimal Desai, p. 291–314, Nov., 1996.

"Proceedings of the Advanced Turbine Systems Annual Program Review Meeting", "Bond Strength and Stress Measurements in Thermal Barrier Coatings", Maurice Gell, p. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, p. 357–370, Nov., 1996.

"Proceedings of the Advanced Turbine Systems Annual Program Review Meeting", "Improved Modeling Techniques for Turbomachinery Flow Fields", B. Lakshiminarayana, p. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393–406, Nov., 1996.

"Proceedings of the Advanced Turbine Systems Annual Program Review Meeting", "Advanced Turbine Cooling, Heat Transfer, and Aerodynamic Studies", Je–Chin Han, p. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427–446.

"Proceedings of the Advanced Turbine Systems Annual Program Review Meeting", "Experimental and Computational Studies of Film Cooling with Compound Angle Injection", R. Goldstein, p. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461–470, Nov., 1996.

"Proceedings of the Advanced Turbine Systems Annual Program Review Meeting", "Steam as Turbine Blade Coolant: External Side Heat Transfer", Abraham Engeda, p. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483–498, Nov., 1996.

"Proceedings of the Advanced Turbine Systems Annual Program Review Meeting", "Closed–Loop Mist/Steam Cooling for Advanced Turbine Systems", Ting Wang, p. 499–512, Nov., 1996.

"Proceedings of the Advanced Turbine Systems Annual Program Review Meeting", "Heat Pipe Turbine Vane Cooling", Langston et al., p. 513–534, Nov., 1996.

"Proceedings of the Advanced Turbine Systems Annual Program Review Meeting", "EPRI's Combustion Turbine Program: Status and Future Directions", Arthur Cohn, p. 535,–552 Nov., 1996.

"Proceedings of the Advanced Turbine Systems Annual Program Review Meeting", "ATS Materials Support", Michael Karnitz, p. 553–576, Nov., 1996.

"Proceedings of the Advanced Turbine Systems Annual Program Review Meeting", "Land Based Turbine Casting Initiative", Boyd A. Mueller, p. 577–592, Nov., 1996.

"Proceedings of the Advanced Turbine Systems Annual Program Review Meeting", "Turbine Airfoil Manufacturing Technology", Charles S. Kortovich, p. 593–622, Nov., 1996.

"Proceedings of the Advanced Turbine Systems Annual Program Review Meeting", "Hot Corrosion Testing of TBS's", Norman Bornstein, p. 623–631, Nov., 1996.

"Proceedings of the Advanced Turbine Systems Annual Program Review Meeting", "Ceramic Stationary Gas Turbine", Mark van Roode, p. 633–658, Nov., 1996.

"Proceedings of the Advanced Turbine Systems Annual Program Review Meeting", "Western European Status of Ceramics for Gas Turbines", Tibor Bornemisza, p. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176—5628.

"Utility Advanced Turbine System (ATS) Technology Readiness Testing—Phase 3", Document #666274, Oct. 1, 1996–Sep. 30, 1997 , Publication Date, Dec. 31, 1997, Report Nos.: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos.: DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May, 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos.: DE–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

FABRICATED TORQUE SHAFT

This invention was made with Government support under Contract No. DE-FC21-95MC31176 awarded by the Department of Energy. The Government has certain rights in this invention.

BACKGROUND OF THE INVENTION

The present invention relates to a torque shaft assembly and, more particularly, to a torque shaft assembled from easily machined parts, with arms that are oriented one to another so that they move different stages of vanes in an optimal fashion.

The key to increased engine performance is increased engine overall pressure ratio. Engine overall pressure ratio is established in the compressor. The key to increased pressure ratio in an advanced compressor is to provide numerous stages of movable compressor vanes whose angles may be varied as the compressor is brought up to speed in order to prevent a condition called "stall". Compressor "stall" is detrimental to the service life and condition of the compressor. Each stage of vanes may have optimal angle schedules that are different one from another, often in non-linear interrelationships. Furthermore, the vanes must replicate the desired angle schedule in both the opening and closing direction, which means that deflection of the moving system under actuation loads must be minimized.

Stage 2 is typically termed the master vane stage. The engine controller is typically programmed to monitor Stage 2, and move the torque shaft so as to move Stage 2 in accordance with a program keyed to engine speed during startup or to effect power turndowns at constant speed when required. A power turndown is used when the power demand on the grid drops such as during lunch time, for example, and the plant operator wishes to keep the turbine-generator set running and synchronized to the grid. The generators cannot be permitted to generate any more power than the amount of power being used by the grid.

When the vane schedule is changed, because of performance requirements or optimization tests, radical changes are usually made to the kinematics of the Variable Guide Vane linkage (VGV) system (referred to by some engineers as Variable Stator Vane (VSV) system). Usually, this means a new torque shaft. Typically torque shafts are cast and then machined to define the torque shaft arm clevis locations.

BRIEF SUMMARY OF THE INVENTION

Certain new engines feature compressors with several stages of movable vanes that have non-linear schedules which necessitate out-of-plane torque shaft arm clevis locations. The out-of-plane torque shaft arm clevis locations make a cast one-piece torque shaft impractical. In addition, the axial spacing of the torque shaft arm clevis locations leave insufficient room to machine a cast torque shaft even if the torque shaft arm clevis locations are in-plane.

Furthermore, the Critical-to-Quality (CTQ) of the VGV system is vane angle accuracy. Accordingly, the present invention provides a torque shaft that addresses the problems associated with VGV systems, and particularly systems in which vanes have non-linear schedules and/or which otherwise preclude or inhibit the manufacture and use of cast, one-piece torque shafts.

The present invention provides a fabricated torque shaft that features a bolt-together design to allow vane schedule revisions with minimal hardware cost. The bolt-together design of the invention further facilitates on-site vane schedule revisions with parts that are comparatively small. The fabricated torque shaft of the invention also accommodates stage schedules that are different one from another in non-linear inter-relationships as well as nonlinear schedules for a particular stage of vanes. The invention also eases machining so as to prevent sag of a long shaft during machining.

Thus, the fabricated torque shaft of the invention is embodied in an assembly comprising a torque shaft main body having a forward end and a rearward end, bearings defined adjacent each end of the shaft main body, and a plurality of arm structures provided at spaced locations along said torque shaft main body for operatively coupling said torque shaft to a plurality of vane stages of a compressor; wherein at least one of the arm structures is detachedly secured to the torque shaft main body so that the at least one arm structure can be removed and replaced with another arm structure.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
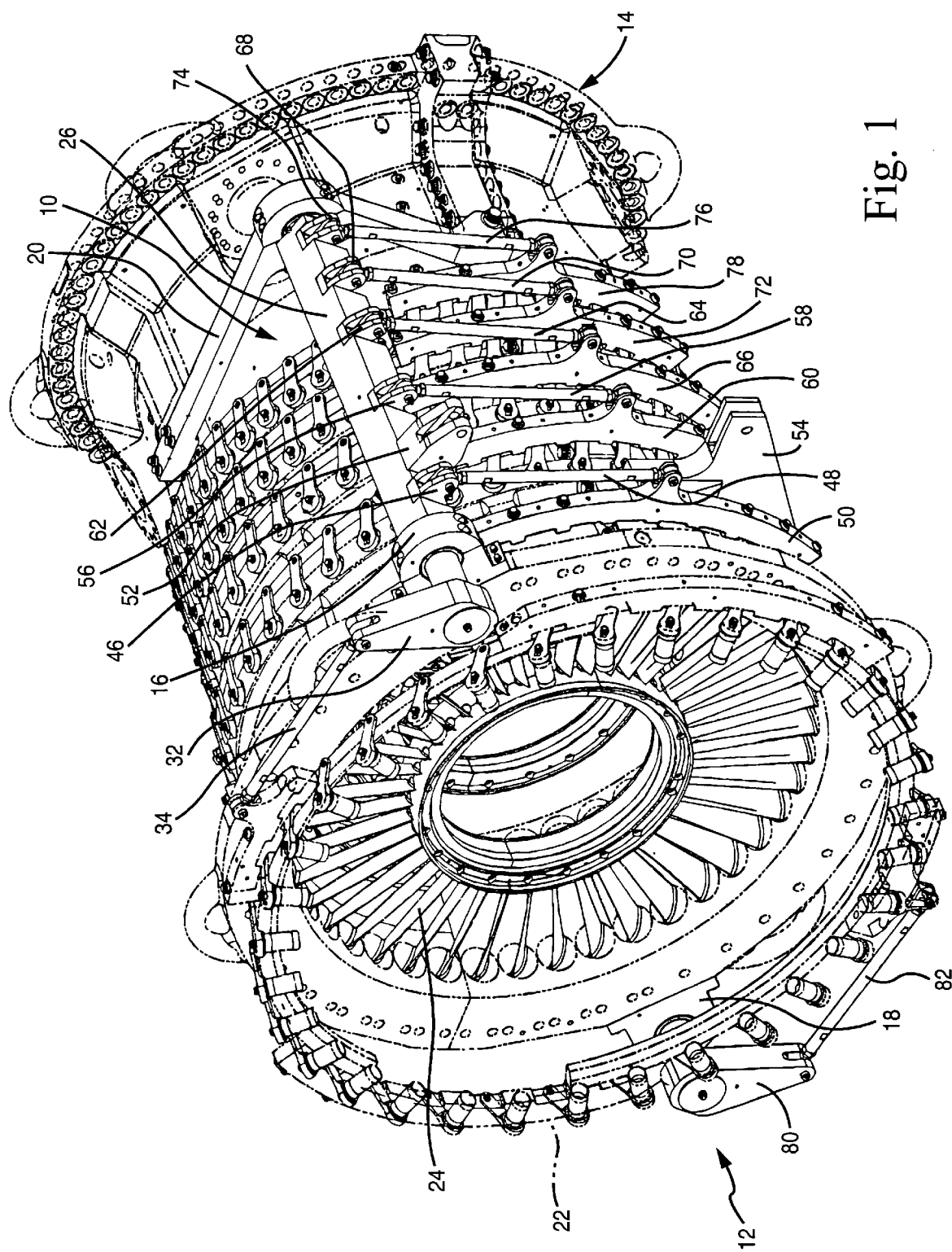
FIG. 1 is a perspective view of a fabricated torque shaft in a variable guide vane system.

FIG. 1 is a schematic perspective view of fabricated torque shafts 10, 12 provided in accordance with a first embodiment of the invention mounted to a compressor case, generally designated with reference number 14. Other key components of an exemplary Variable Guide Vane (VGV) system are shown in FIG. 1, to illustrate the component inter-relationships. More specifically, the first and second fabricated torque shafts 10, 12 are mounted on diametrically opposite sides of the compressor case 14. Each shaft 10, 12 is mounted to a respective forward torque shaft mount 16, 18 and aft torque shaft mount 20 (only one of which can be seen in FIG. 1). The inlet and inlet guide vanes are omitted from FIG. 1 for clarity and the inlet guide vanes are instead schematically shown as a dash dot circle 22 at the forward end of the compressor case. As a result, the Stage 0 vanes 24 are visible in FIG. 1 at the forward end of the compressor case.

As described in greater detail below, the torque shaft includes a main body 26 having a four sided, generally square coupling 28 at a forward end thereof for being received in a complementary receptacle 30 of an inlet guide vane arm 32, which is in turn coupled to an inlet guide vane turnbuckle 34 as shown in FIG. 1. In the illustrated embodiment, the IGV arm is secured to the square coupling 28 with a wire locking insert 36, a screw 38 and a retainer member 40, although other known end coupling and retention assemblies may be provided in their stead.

Figure 2:
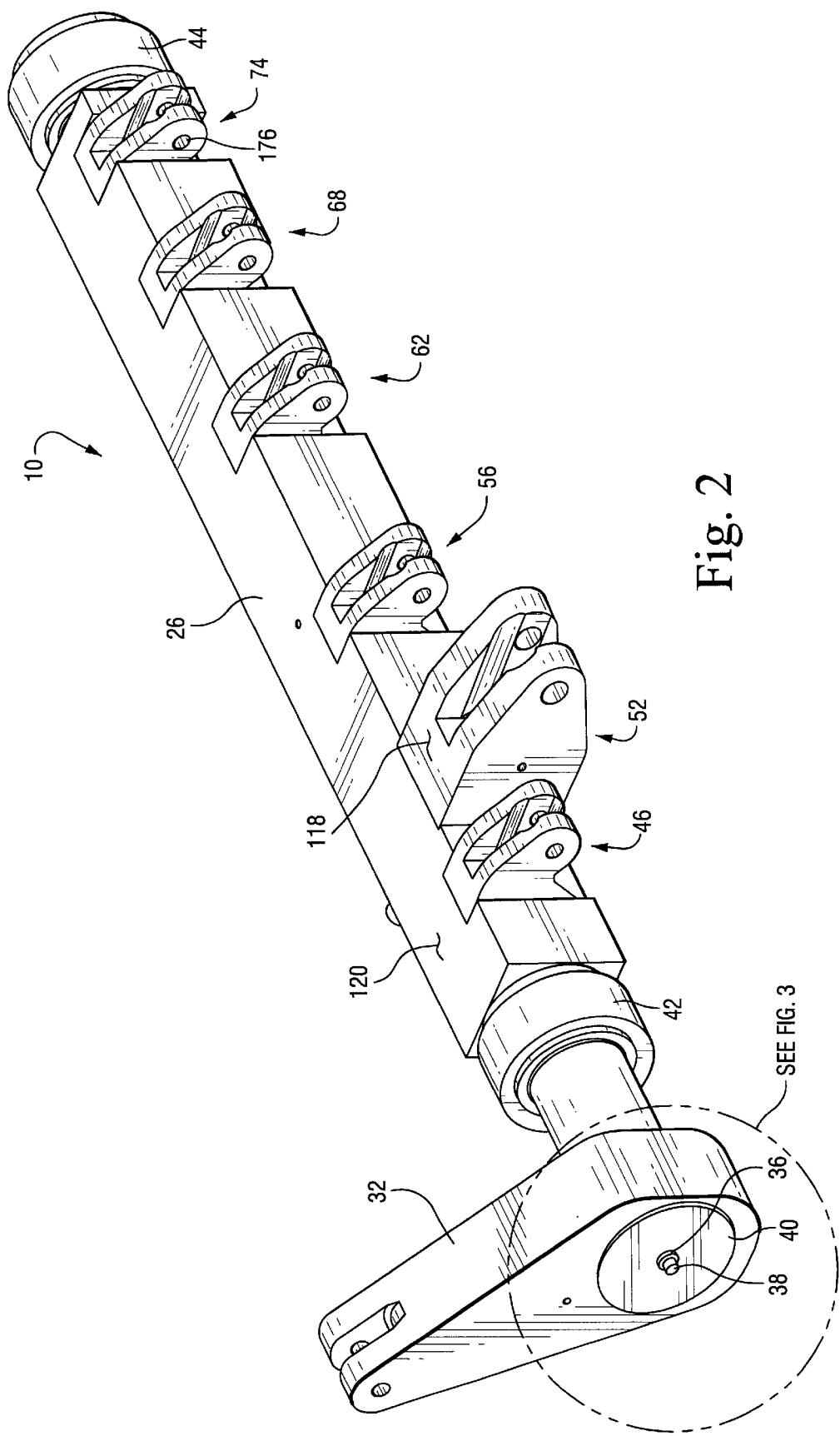
FIG. 2 is a perspective view of a fabricated torque shaft comprising a first embodiment of the invention.
Figure 3:
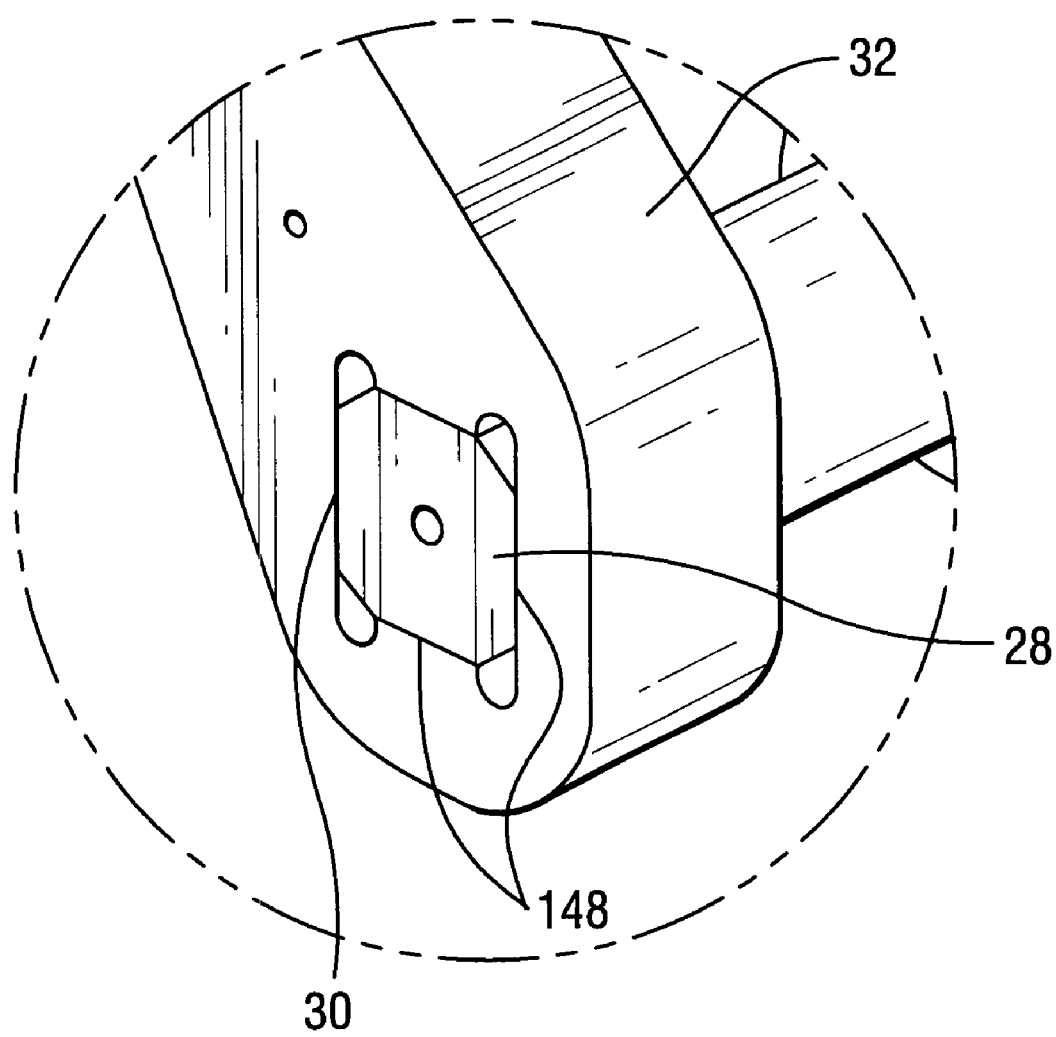
FIG. 3 is an enlarged view of the area identified in FIG. 2 with the retainer and bolt parts omitted.
Figure 4:
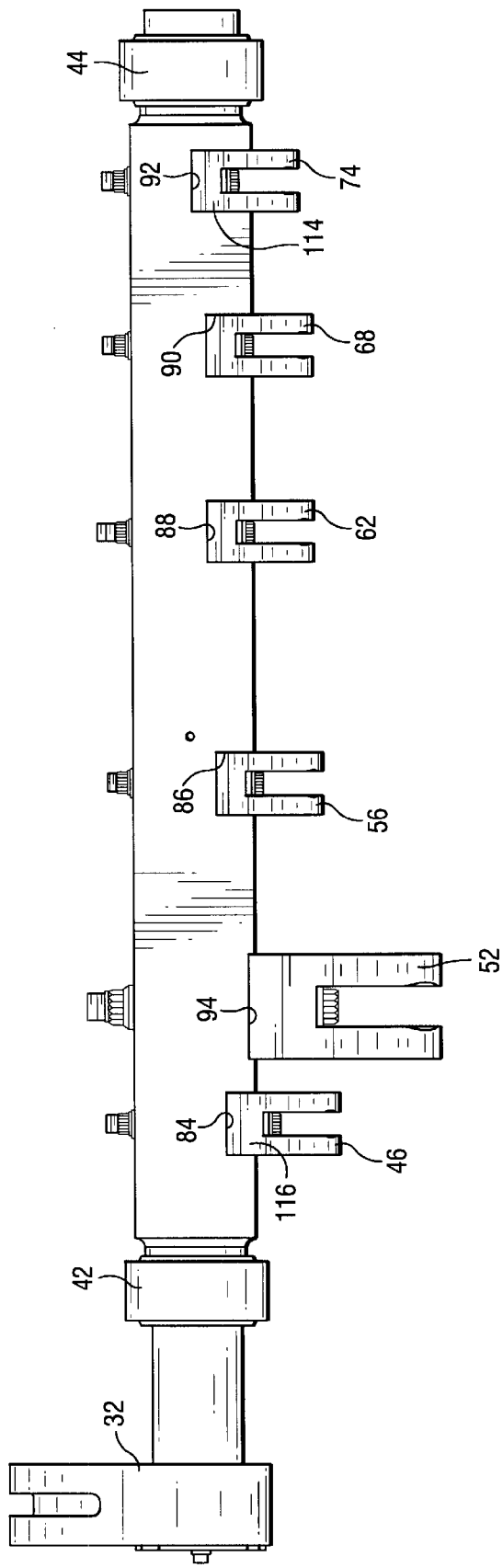
FIG. 4 is a top plan view of the fabricated torque shaft of FIG. 2.
Figure 5:
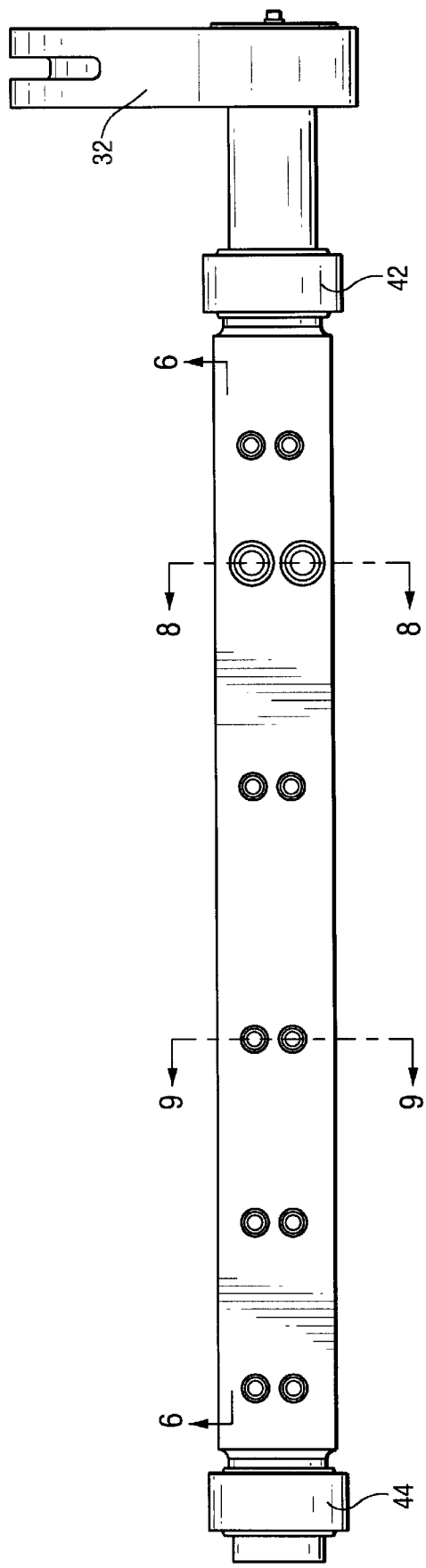
FIG. 5 is a rear elevational view of the fabricated torque shaft of FIG. 1.

In the presently preferred embodiment, the torque shaft main body 26, best seen in FIGS. 2, 4 and 5, is generally rectangular in cross-section, most preferably square as illustrated, to allow for planar support during machining of its features, thereby to preclude sag and consequent inaccurate geometry. Adjacent the forward end of the torque shaft main body, a bearing 42 is provided for being received in the forward torque shaft mount 16 of the compressor case (FIG. 1). Another bearing 44 is likewise provided at the opposite longitudinal end of the torque shaft main body 26 for being received in the aft torque shaft mount 20 of the compressor casing.

In the illustrated embodiment, an arm structure such as an arm clevis is detachably secured to the torque shaft main body for each stage of the VGV system as well as for the actuator input. In a conventional manner, each particular stage of vanes includes a unison ring for shifting the vanes of the stage in unison. Each unison ring is linked to a respective arm clevis of the torque shaft with a turnbuckle. Thus, as illustrated in FIG. 1, there is a Stage 0 arm 46 pivotally interconnected to a Stage 0 turnbuckle 48 which is in turn pivotally coupled to a Stage 0 unison ring 50. Adjacent to and downstream of the Stage 0 arm, an input arm 52 is provided for being mechanically linked to an actuator mount 54 in a conventional manner. Downstream from the input arm there are respectively Stage 1–4 arms 56,62,68,74 pivotally interconnected to respective Stage 1–4 turnbuckles 58,64,70,76 which are in turn pivotally coupled to a respective Stage 1–4 unison ring 60,66,72,78. Accordingly, a respective arm structure is provided for each of the Stages for translating movement of the torque shaft via the respective turnbuckle to the respective unison ring. As illustrated and as discussed in greater detail hereinbelow, in the presently preferred embodiments of the invention a bolted on arm clevis structure (hereinafter referred to simply as arm or arm structure) is provided for each movable stage of the compressor. It is to be understood, however, that one or more of the arm structures could be cast and machined with the torque shaft main body. Therefore the invention is embodied in its broadest respect in a fabricated torque shaft having at least one detachable arm structure, although it is preferred that all arms provided as a part of the torque shaft, including the input arm, be detachably secured to the main body thereof.

As mentioned above, two torque shafts 10, 12 are provided, one on each diametrically opposite side of the compressor case 14. In the illustration of FIG. 1, only the IGV arm 80, IGV turnbuckle 82 and forward torque shaft mount 18 of the second torque shaft 12 can be seen. It is to be understood, however, that an assembly generally corresponding to torque shaft 10 would be provided on the opposite side of the compressor case.

The specific links, torque shaft interface features and turnbuckle hole location of each arm combined with the arm interface features on the torque shaft determine the specific characteristic location of each vane stage as the torque shaft rotates. Thus, as illustrated in particular in FIG. 4, in an exemplary embodiment of the invention, the receptacles 84,86,88,90,92 provided for receiving the respective arms are machined to different depths in the torque shaft main body such that the receptacle 84 for the Stage 0 arm is most shallow of the arm receptacles with the receptacles 86,88, 90,92 for,the Stage 1 arm, the Stage 2 arm, the Stage 3 arm and the Stage 4 arm, respectively being progressively more deeply defined in the torque shaft main body 26. A receptacle 94 is also provided for the input arm 52. In the illustrated embodiment, the receptacle for the input arm is at a minimal depth, provided substantially to determine the proper location for the input arm along the length of the torque shaft main body and its proper orientation with respect to the axis of the shaft.

The features controlling the placement of the arms in the torque shaft can be better appreciated from FIGS. 6, 7, 8, and 9. A shear bushing 96 is press-fit into shear bushing receptacle 98 defined in each arm receptacle and interfaces precisely with the intended arm.

A counter bore 100 is also defined in each receptacle to receive the shear bushing that is press fit into the torque shaft.

Figure 7:
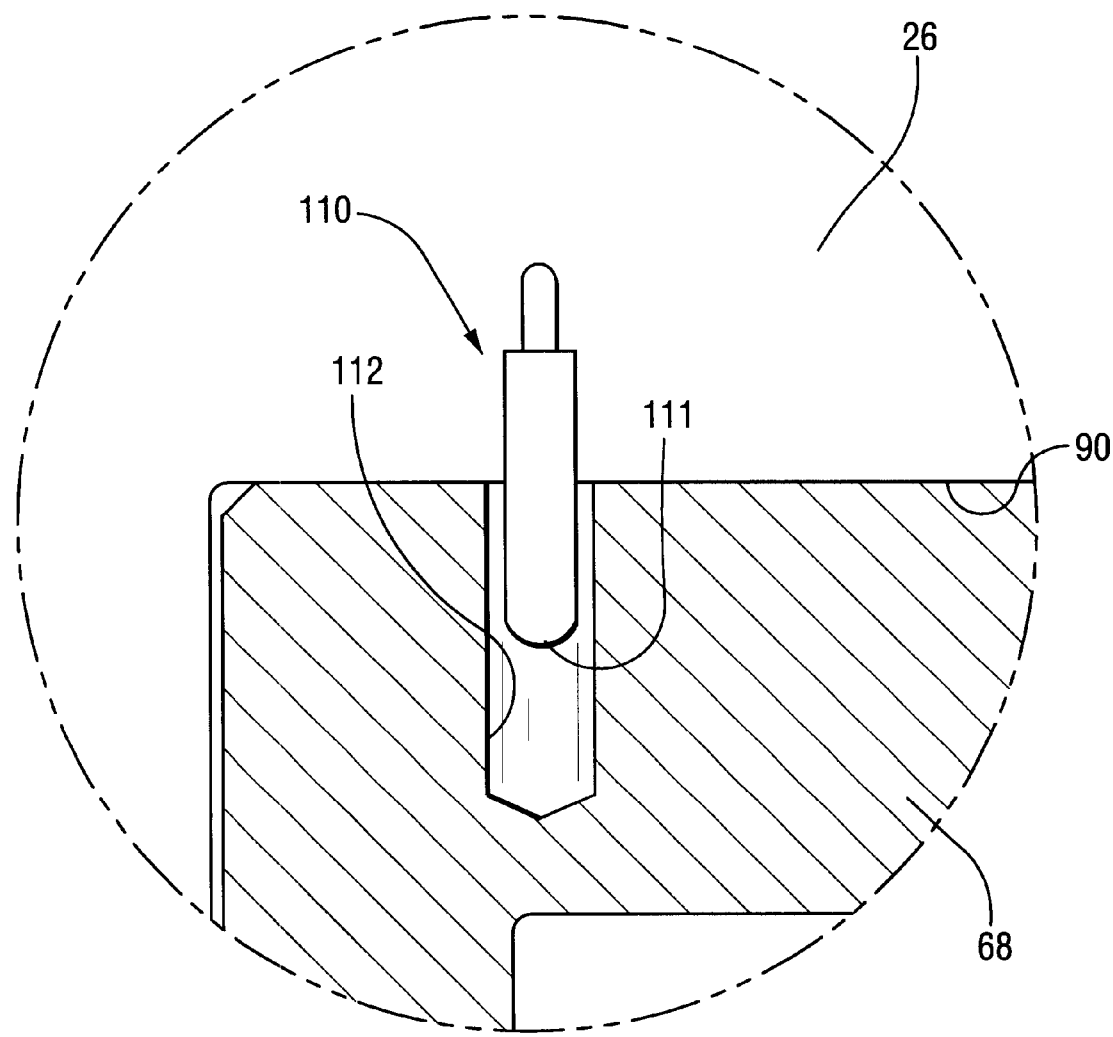
FIG. 7 is an enlarged view of the area identified in FIG. 6.
Figure 8:
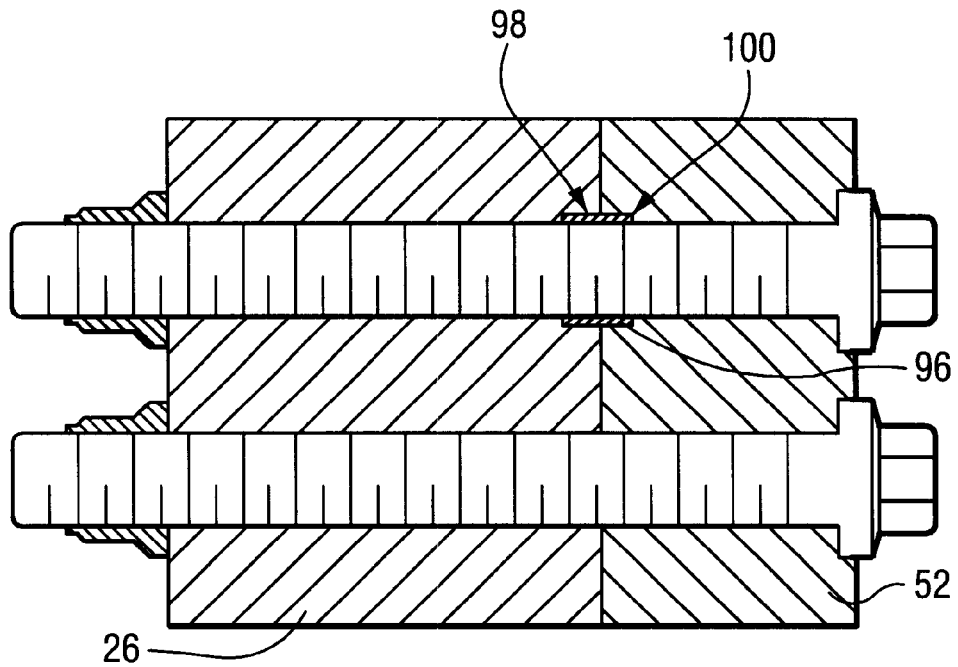
FIG. 8 is a cross—sectional view taken along line 8—8 of FIG. 5 with the arm side wall portion omitted for clarity.
Figure 9:
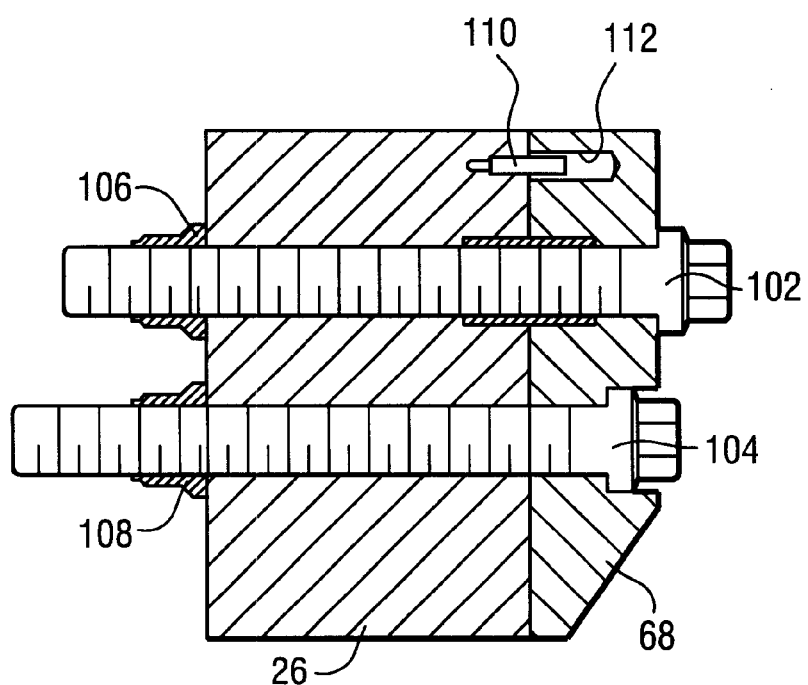
FIG. 9 is a cross-sectional view taken along line 9—9 of FIG. 5 with the arm side wall portion omitted for clarity.

First and second bolts 102,104 and nuts 106,108 provided to secure each arm to the torque shaft. The nuts and bolts provided solely to clamp the arm to the torque shaft and thus do not produce positional errors. Pins 110 as shown in the detail of FIG. 7 are associated with each arm and its respective receptacle to ensure that the arm is installed in its intended position.

Figure 6:
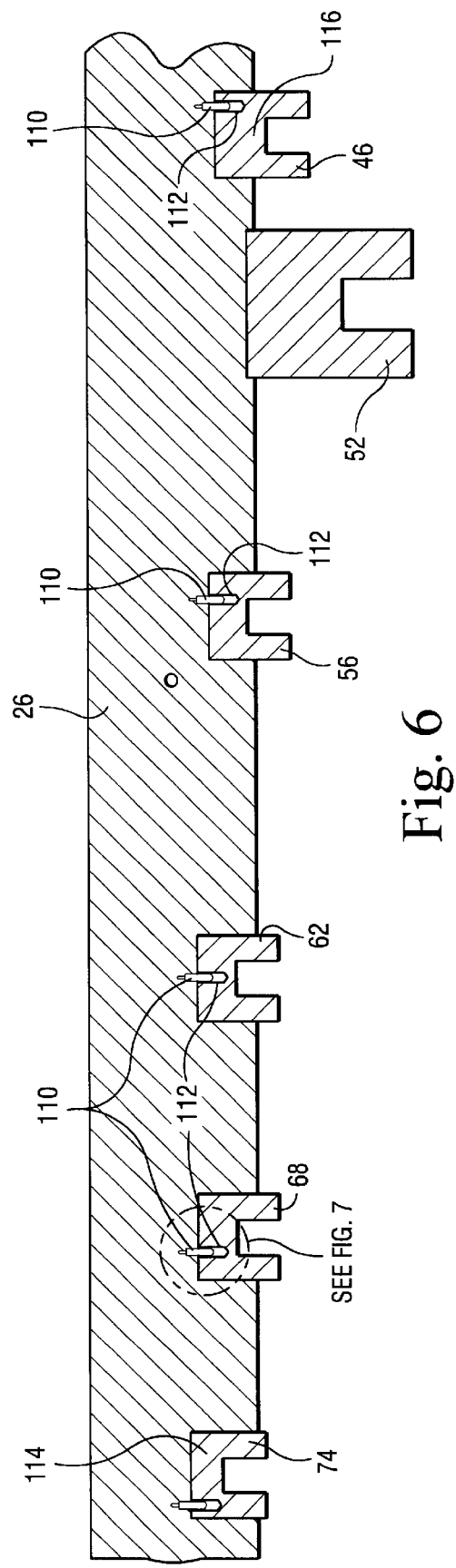
FIG. 6 is a view taken along line 6—6 of FIG. 5.

As illustrated in FIG. 6, the pin bores 112 respectively defined in the torque shaft main body and in each arm structure are uniquely disposed. This ensures that an arm structure adapted to, for example, the 4$^{th}$ Stage will only be mountable to the 4$^{th}$ Stage receptacle due to the mating pin 110/112 configuration. Thus, in the illustrated embodiment, the Stage 4 pin/receptacle 110/112 is disposed on the rearward end side of the receptacle and arm respectively. The location of the pin is progressively shifted towards the forward end of the torque shaft for each respective receptacle and arm sequentially disposed along the length of the torque shaft so that the Stage 2 pin 110 is disposed generally centrally of the receptacle and arm whereas the Stage 0 pin is disposed on the forward end side of the Stage 0 receptacle. As shown in detail in FIG. 7, one end 111 of the pin 110 is generally domed for being aligned and received in the respective pin bore 112 of the arm. The pin is preferably fixedly secured to the torque shaft main body 26 to be maintained within the respective arm receptacle.

As stated above, the receptacles for each of the arms may be machined to different depths depending upon the vane schedule. The arms themselves are desirably provided in shapes determined by the respective vane schedule. In the embodiment illustrated in FIG. 2, the arms provided for each of Stages 0–4 have generally a same or similar shape except that the thickness of the base of certain of the arms is varied in this embodiment. Thus, for example, the base 114 of the Stage 4 arm 74 is less thick than the base 116 of the Stage 0 arm 46.

Figure 10:
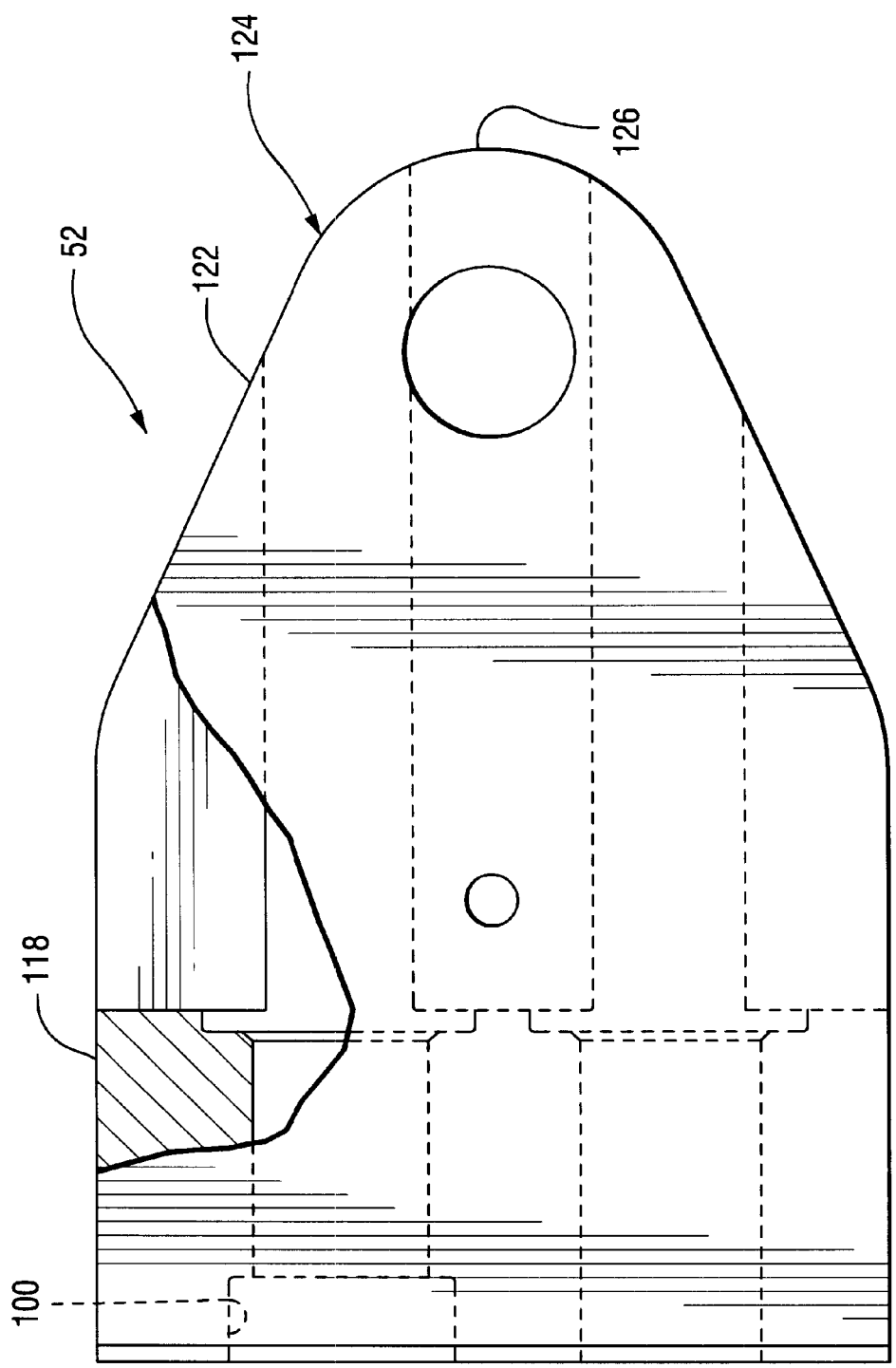
FIG. 10 is a side elevational view of an input arm provided in the embodiment shown in FIG. 2.
Figure 11:
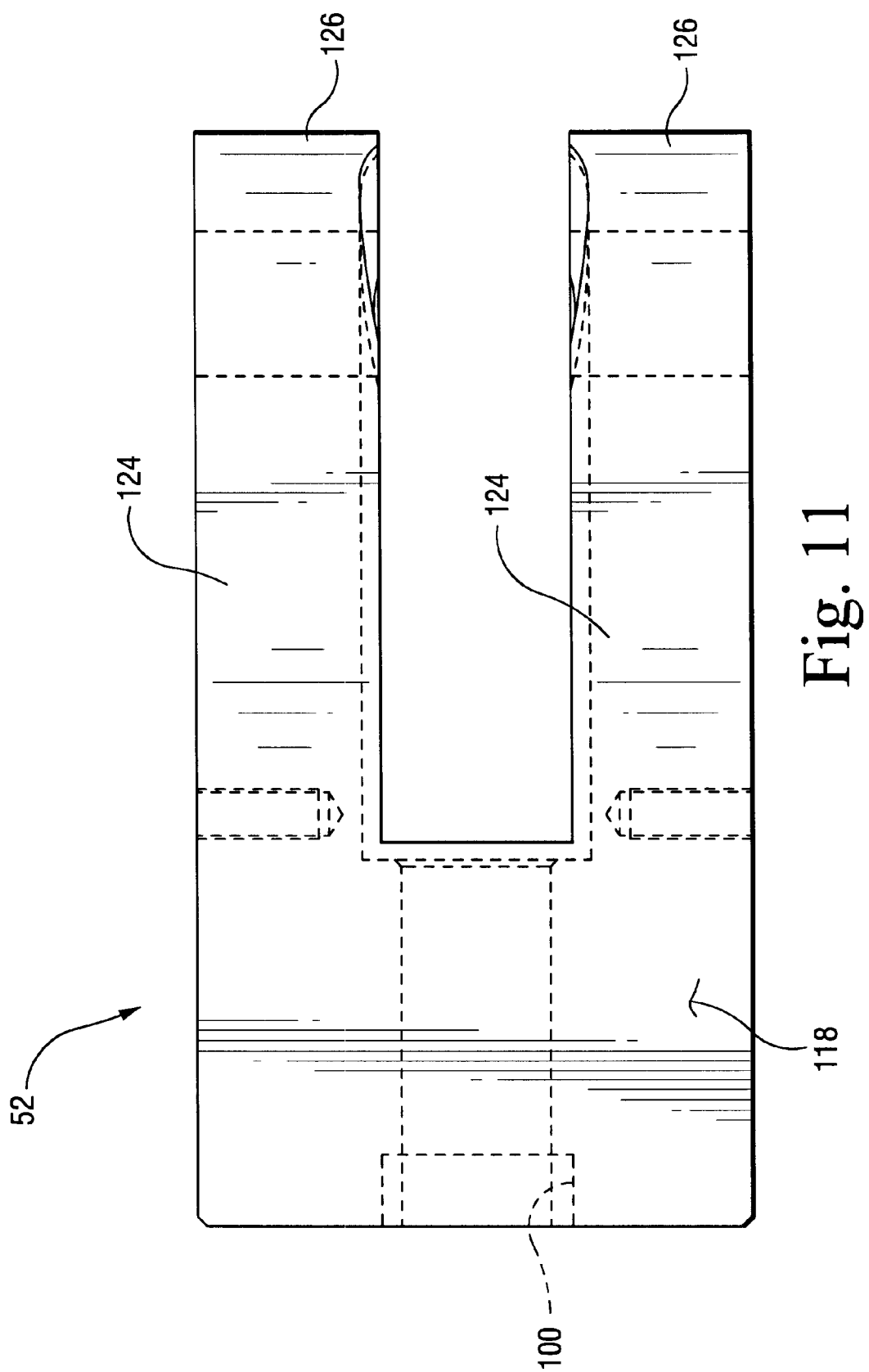
FIG. 11 is a top plan view of the input arm shown in FIG. 10.
Figure 12:
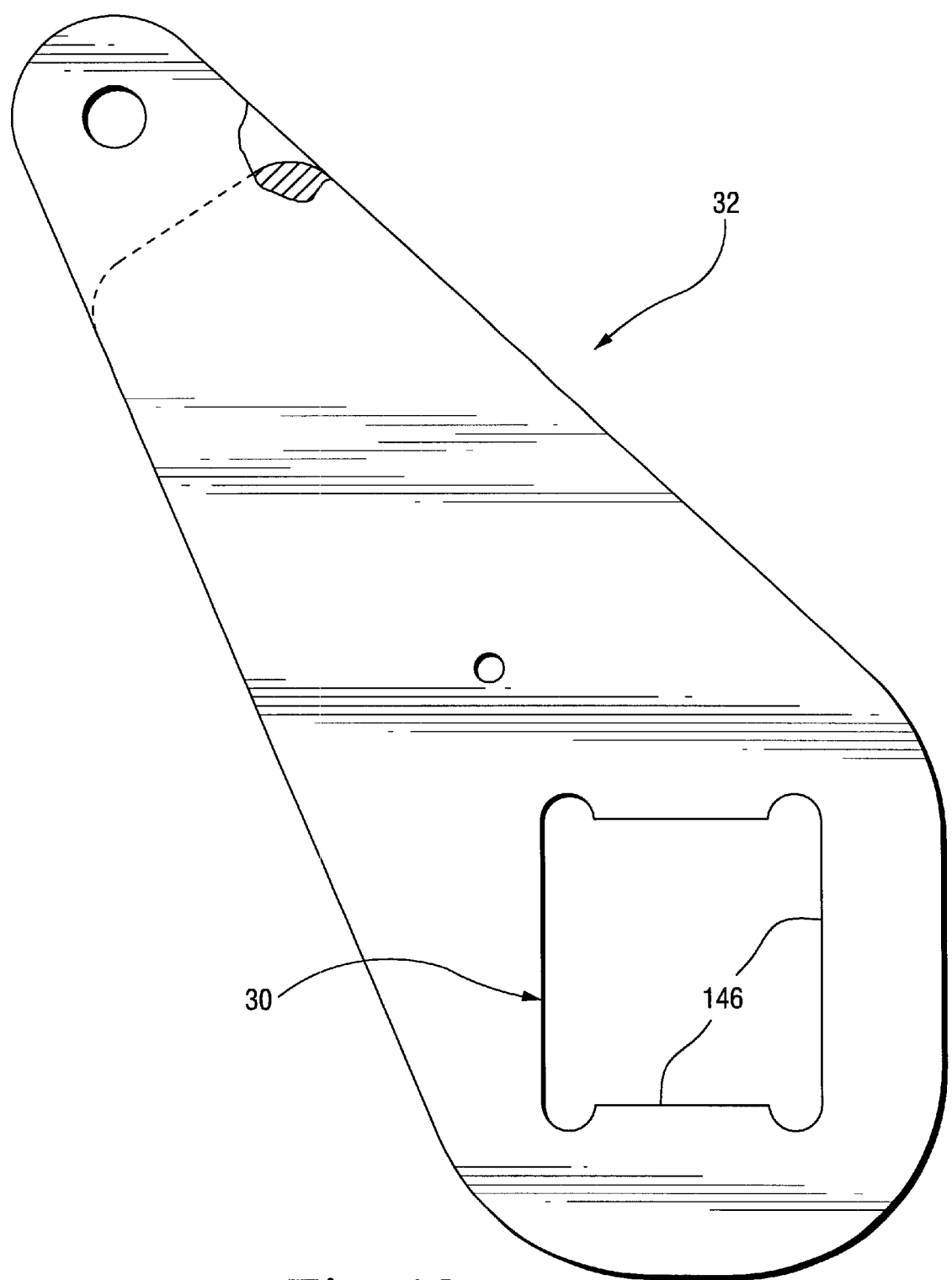
FIG. 12 is a side elevational view of an inlet guide vane (IVG) arm provided in the embodiment of FIG. 2.

As illustrated in FIGS. 10 and 11, the input arm 52 defines a profile that includes a first generally flat portion 118 projecting generally from a plane of the top surface 120 of the torque shaft main body 26, an inclined portion 122 on each of the two side wall portions 124 thereof and rounded tips 126 to minimize potential interference with other components during the angular adjustment of the torque shaft.

As mentioned above, the inlet guide vane arm 32 in the embodiment of FIG. 2 includes a receptacle 30 having generally flat planar surfaces 146 for respectively engaging generally flat planar surfaces 148 of the square coupling 28 of the torque shaft main body. Thus, rotation of the torque shaft main body according to displacement of the input arm is translated to a displacement of the inlet guide vane arm. The configuration of the IGV arm is determined according to the vane schedule and in the presently preferred embodiment, the IGV arm can be removed and replaced as necessary or desirable.

Figure 13:
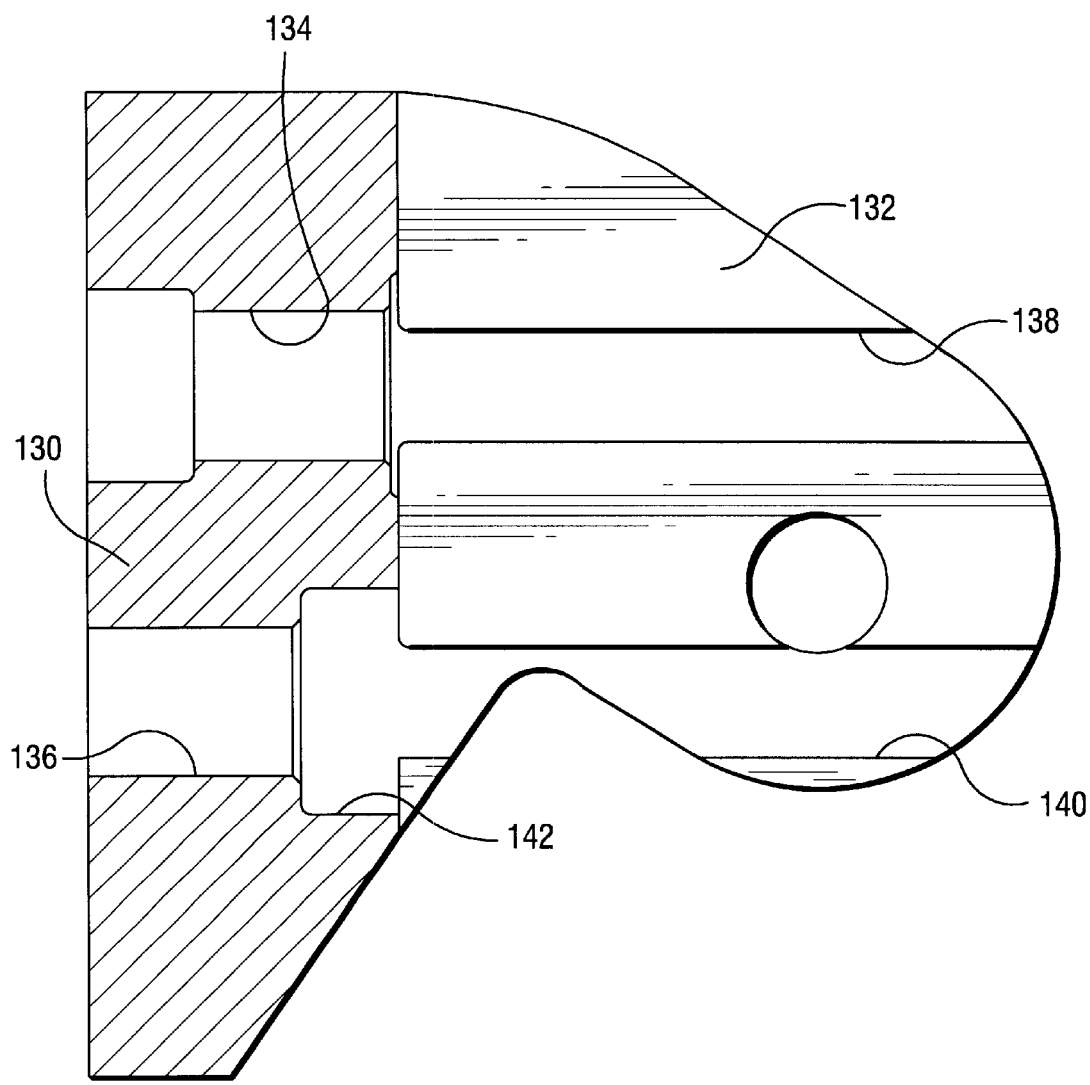
FIG. 13 is a cross-sectional view of an exemplary arm provided: for Stages 0–4 in the embodiment of FIG. 2.
Figure 14:
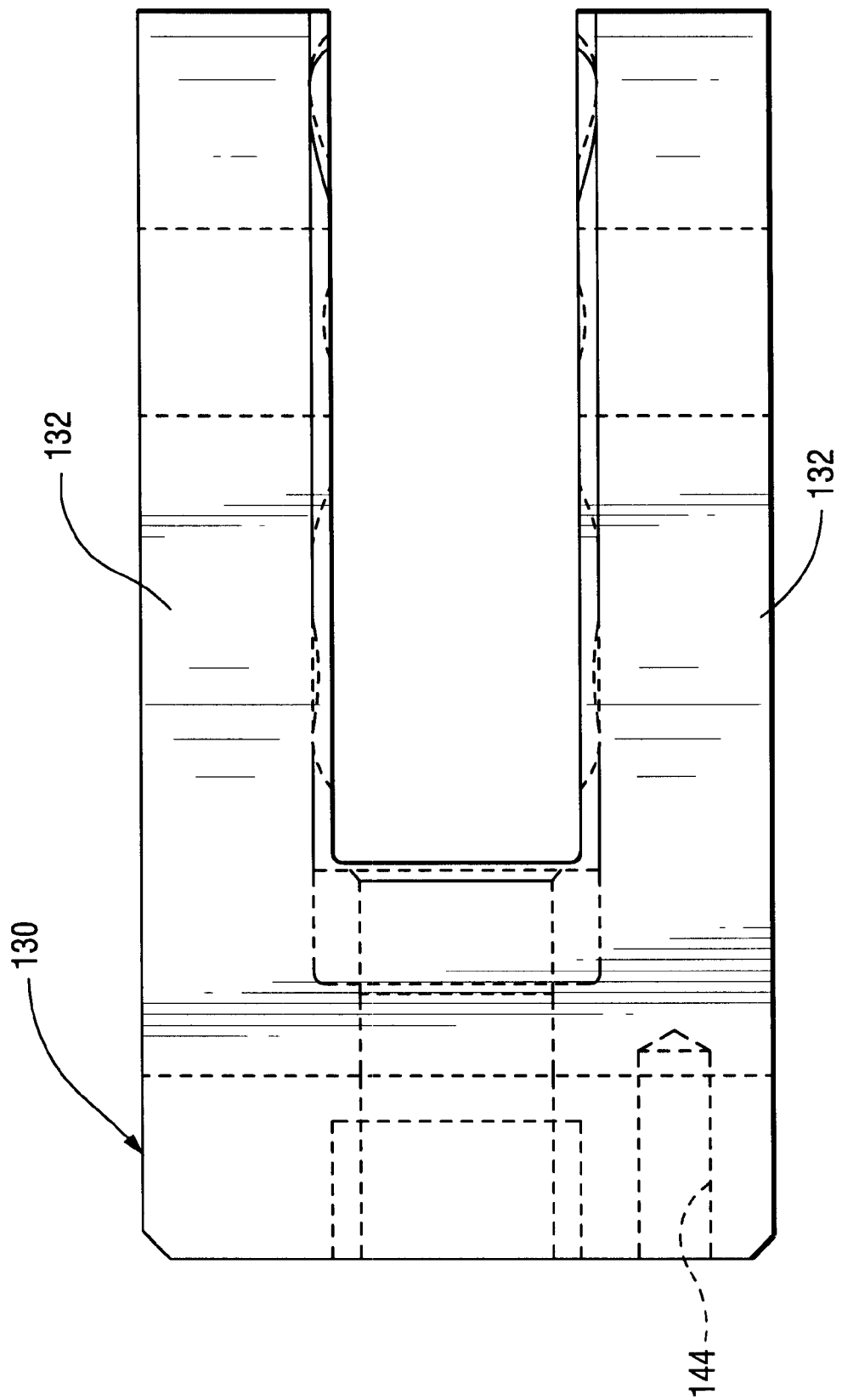
FIG. 14 is a top plan view of the arm shown in FIG. 13.

An exemplary arm structure of the type provided for Stages 0–4 is illustrated in FIGS. 13–14. Each such arm includes a base 130 by which the arm is secured e.g., as by bolting, to the torque shaft main body and first and second side walls 132 each of which projects in a respective plane that is generally perpendicular to a plane of the base. The bolts for securing the arm to the torque shaft main body 26 are inserted through respective bores 134,136 in the base of the arm. To accommodate the enlarged heads of the respective bolts, scarf cuts 138,140 are defined on the inner side of each arm side wall. Further, in the illustrated embodiment, a counter bore 142 is defined for receiving the head of the lower bolt so that the bolt will, be disposed entirely within the profile of the arm. A bore 144 is further defined in the base for receiving the pin that determines the proper position of the arm with respect to the torque shaft main body. As will be appreciated, the arms are respectively shaped to achieve the desired vane schedule of the respective stage and so that the torque shaft assembly will not strike another part while it is moving.

As is apparent from an examination of FIG. 2, in particular, in one exemplary embodiment, the Stage 0–4 arms have a generally similar configuration although the thickness of the base of certain of the arms may differ and the arms are mounted to receptacles of varying depth according to the vane schedule. The arms, however, can and will generally vary in shape according to the vane schedule of the compressor to which the torque shaft is mounted. Thus, an advantage of the fabricated torque shaft assembly of the invention is that one or more of the arms can be removed and replaced either due to potential failure, or because of a change in vane schedule according to which arm(s) of a different shape is determined to be necessary or desirable.

Figure 15:
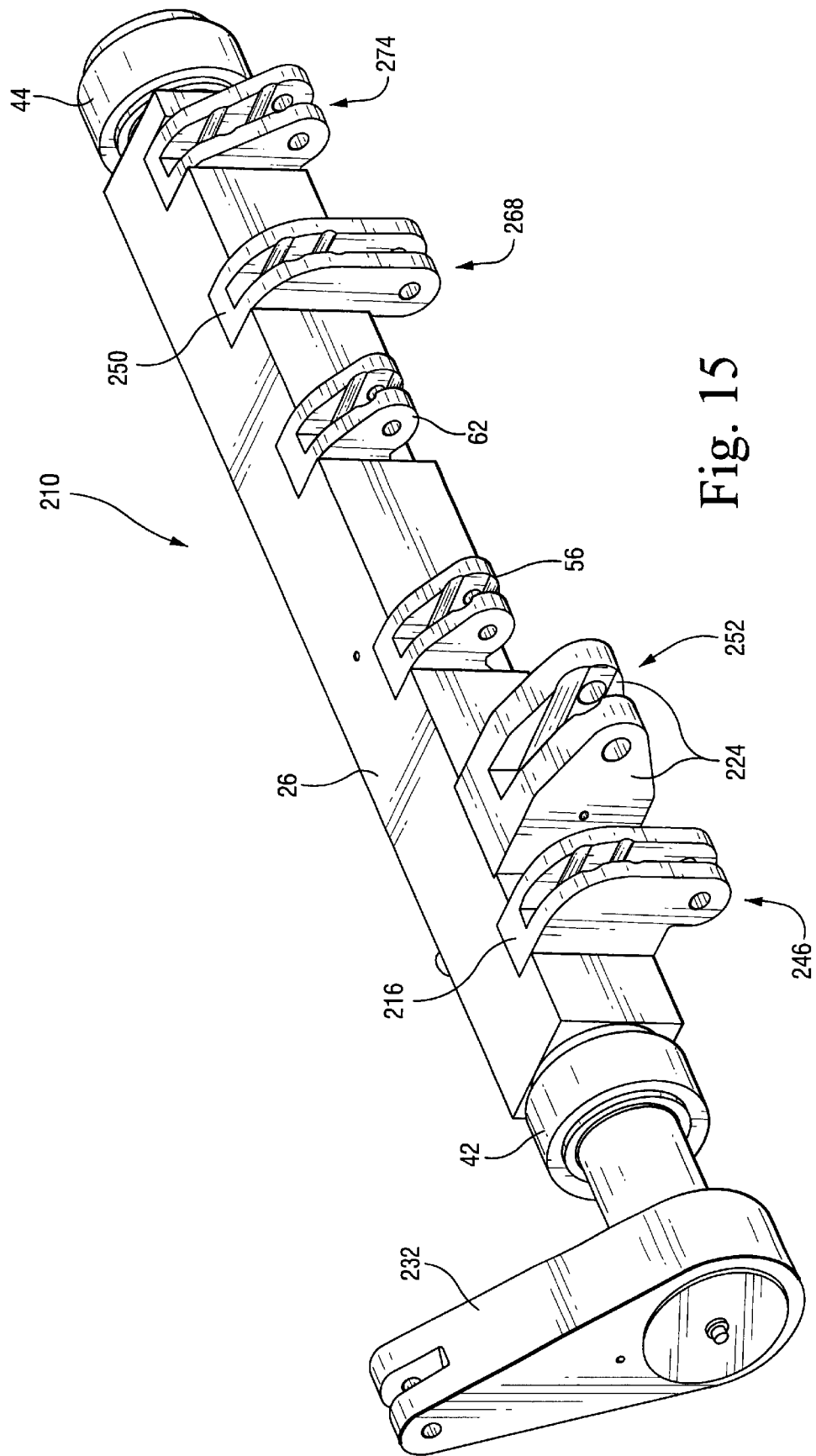
FIG. 15 is a perspective view of a fabricated torque shaft comprising a second embodiment of the invention.
Figure 16:
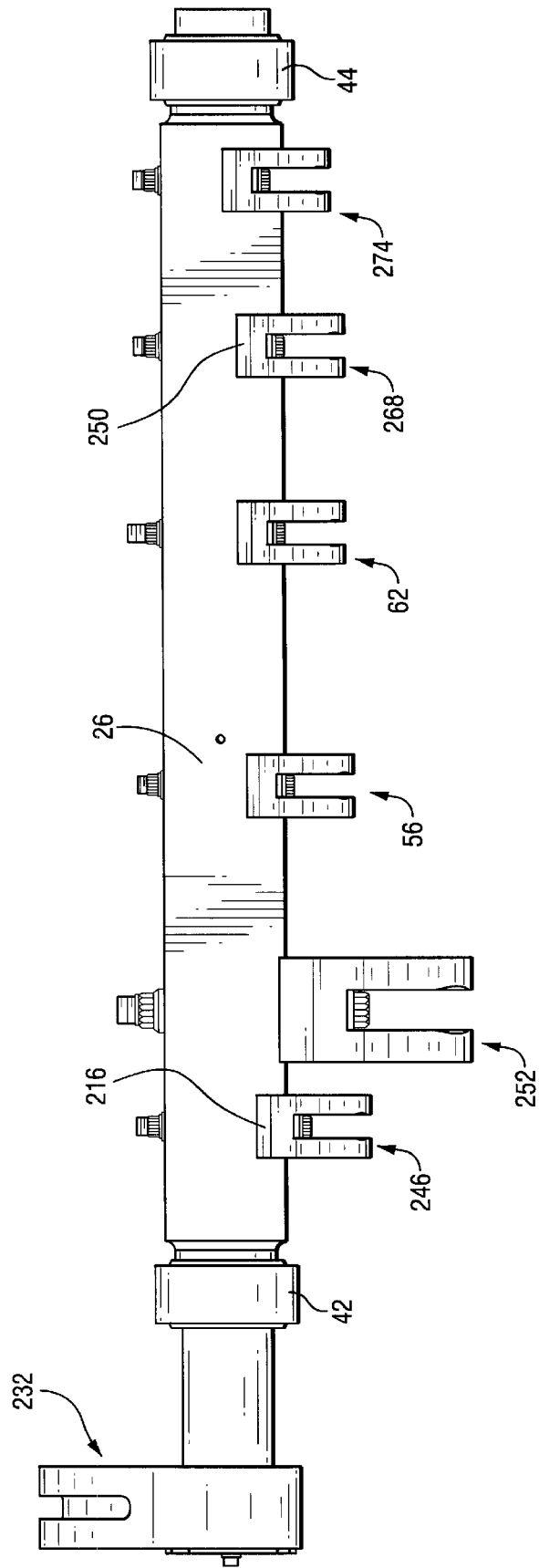
FIG. 16 is a top plan view of the fabricated torque shaft shown in FIG. 15.
Figure 17:
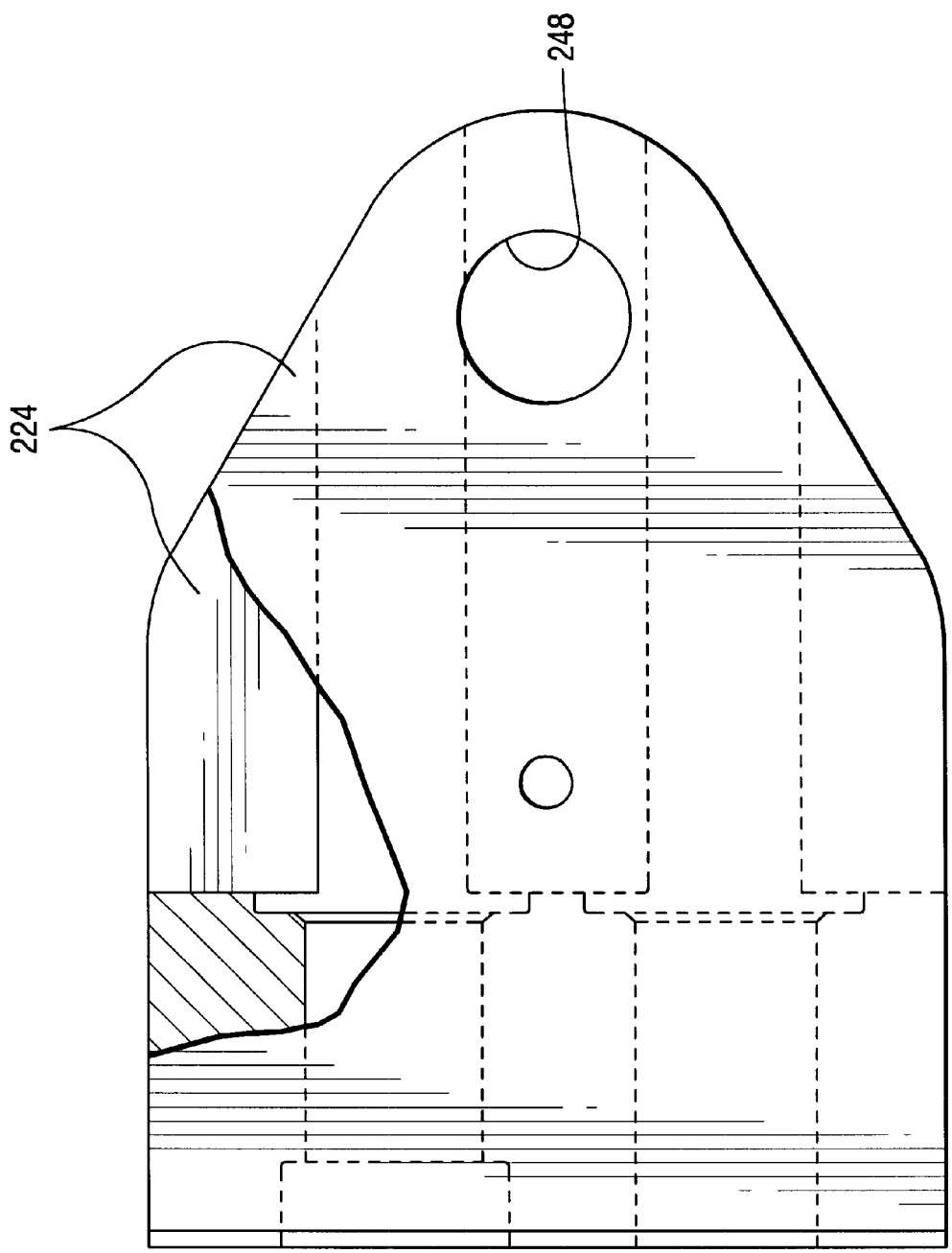
FIG. 17 is a side elevational view partly in cross-section of an input arm provided in the embodiment of FIG. 15.

Thus, FIG. 15 illustrates an alternate embodiment of the invention in which certain of the arms of the fabricated torque shaft 210 have been removed and replaced as compared to the embodiment of the FIGS. 1–2. In the embodiment illustrated in FIG. 15, the input arm, the IGV arm and the S0, S3 and S4 arms have all been removed and replaced with arms of a different shape to accommodate a new vane schedule. As can also be seen from FIG. 15, the IGV arm is rounded at the attachment end as compared to the IGV arm of the FIG. 2 embodiment. Also, as illustrated, the input arm 252 is more truncated to receive its respective turnbuckle at a point closer to the torque shaft main body 26 than the input arm 52 of the FIG. 2 embodiment. As shown in FIG. 17, the more truncated side wall portions 232 alters the disposition of the turnbuckle receptacle 248; for receiving the respective turnbuckle, thus changing the amount by which the torque arm 210 rotates on actuation.

Figure 19:
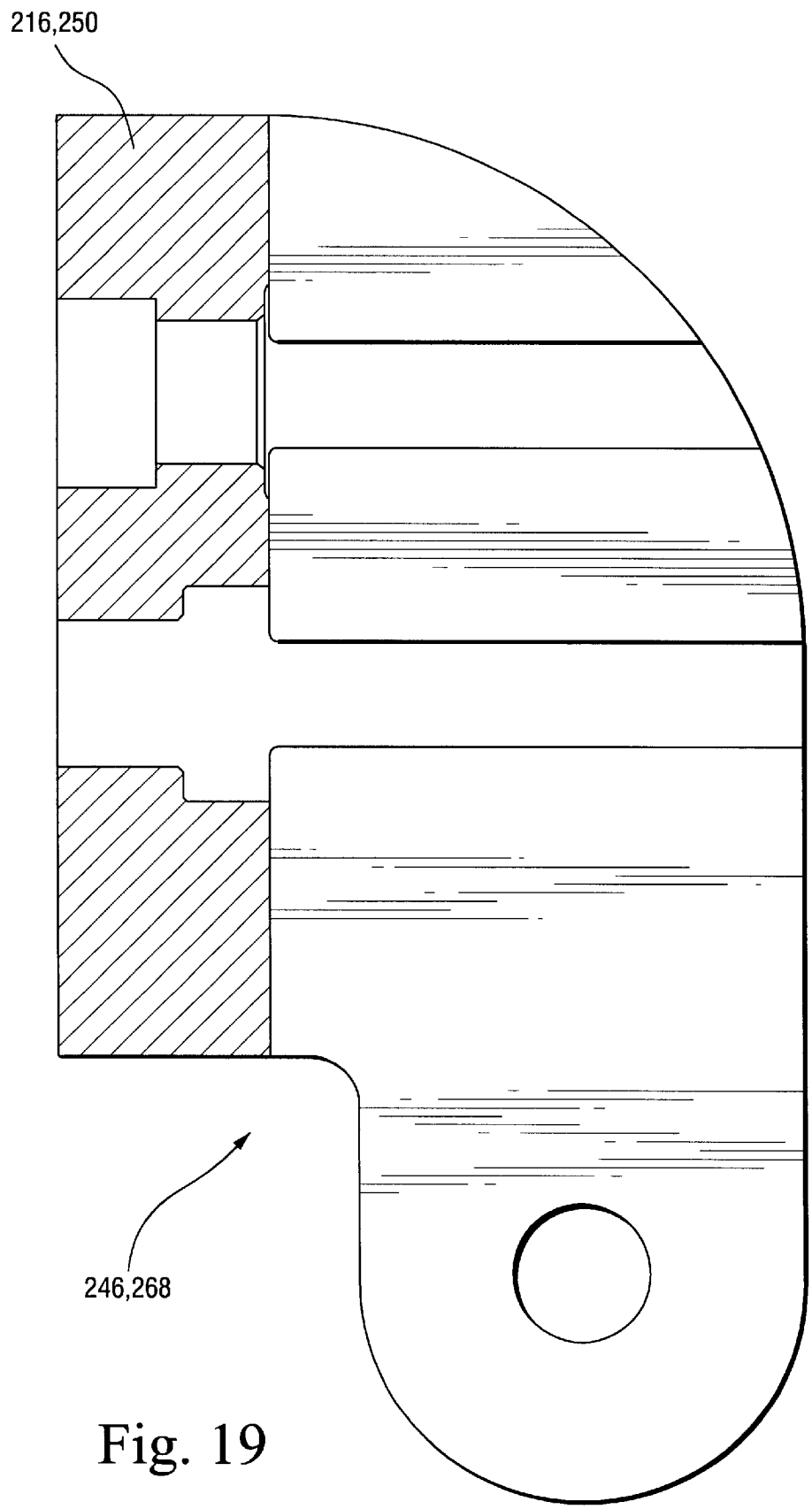
FIG. 19 is a cross-sectional view of a stage 3 arm provided in the embodiment of FIG. 15.

The S0 arm 246 and the S3 arm 268 are each substantially modified in the embodiment of FIGS. 15 and 19 so as to depend downwardly substantially below the elevation of the turnbuckle receptacle of :the corresponding arm of the FIG. 2 embodiment. As in the FIG. 2 embodiment, however, the S3 arm 268 is received in a receptacle 90 that is deeper than the receptacle 84 of the S0 arm 246. Also, the depth or thickness of the base 250 of the S3 arm 268 is less than the base 216 of the S0 arm 246.

Figure 18:
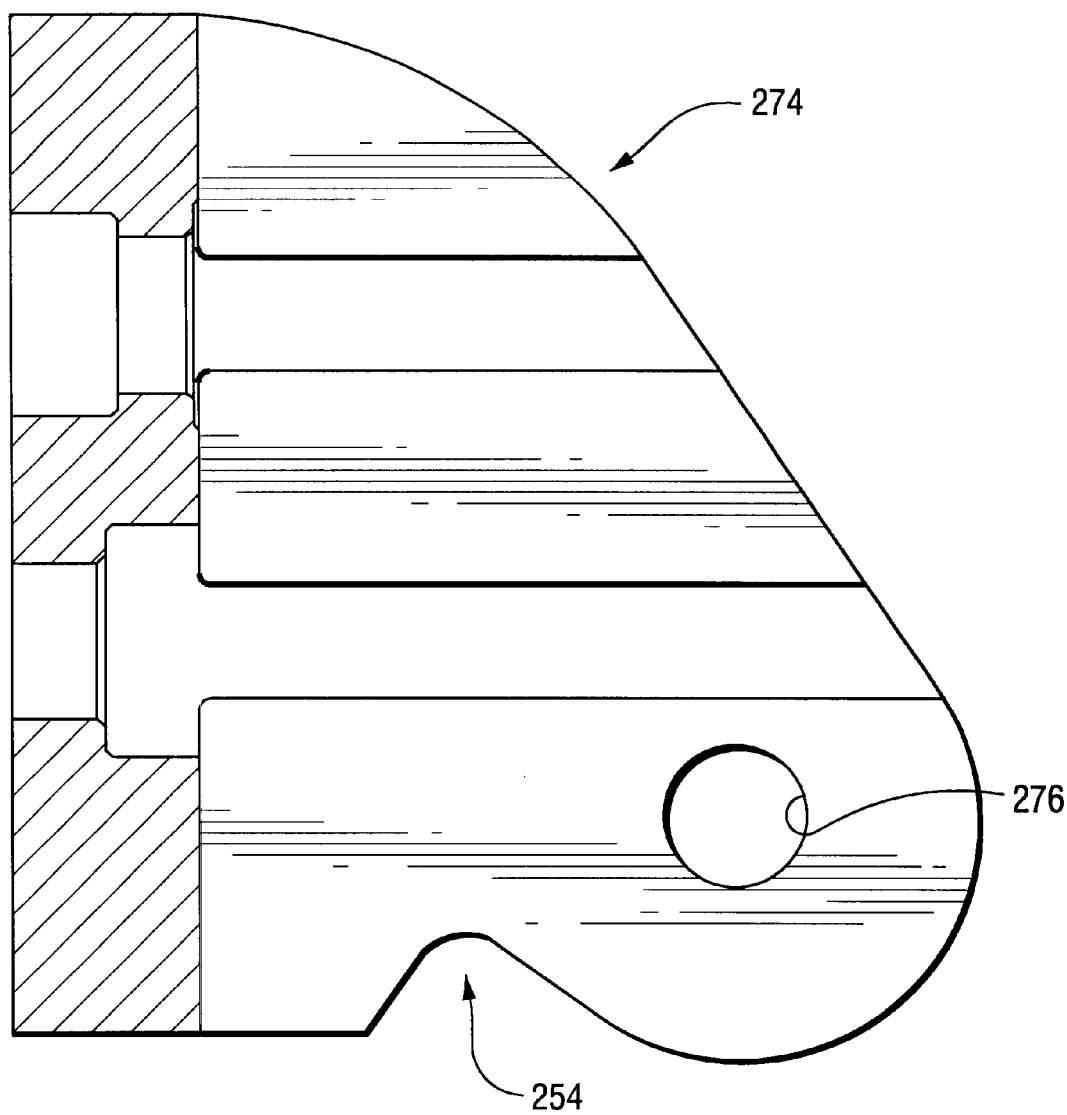
FIG. 18 is a cross-sectional view of a stage 4 arm provided in the embodiment of FIG. 15.

Finally, as illustrated in FIG. 18, the shape of the S4 arm 274 has been modified so as to be disposed with its turnbuckle receptacle 276 displaced downwardly relative to the turnbuckle receptacle 176 of the FIG. 2 embodiment. As can also be seen, the recess 254 along the bottom surface of the arm 274 is less pronounced in the FIG. 18 embodiment than in the embodiment of FIG. 2. As will be understood, the arms are fastened to the common torque shaft main body 26 using nuts and bolts as in the FIG. 2 embodiment. Only certain of the arm structures selected for attachment to the torque shaft main body have been changed to accommodate the particular vane schedule of the compressor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fabricated torque shaft comprising:
   a torque shaft main body having a forward end and a rearward end;
   a first bearing being defined adjacent said forward end and a second bearing being defined at said rearward end of said main body;
   a plurality of arm structures provided at spaced locations along said torque shaft main body for operatively coupling said torque shaft to a plurality of vane stages of a compressor;
   at least one of said arm structures being detachedly secured to said torque shaft main body so that said at least one arm structure can be removed and replaced with another arm structure, wherein said torque shaft main body has a generally rectangular cross-section along at least a substantial portion of a length thereof.

2. A fabricated torque shaft as in claim 1, wherein said torque shaft main body has a generally square cross-section along the portion of a length thereof between said forward and rearward bearing structures.

3. A fabricated torque shaft as in claim 1, wherein said torque shaft main body comprises at least one recessed receptacle for receiving said at least one detachable arm structure.

4. A fabricated torque shaft as in claim 1, wherein a plurality of said arm structures are detachable secured to said torque shaft main body.

5. A fabricated torque shaft as in claim 4, wherein said torque shaft main body includes a recessed receptacle for receiving each said detachable arm structure.

6. A fabricated torque shaft as in claim 5, wherein said recessed receptacles are machined in said torque shaft main body.

7. A fabricated torque shaft as in claim 1, further comprising an input arm disposed on said torque shaft main body for controlling a rotational position of said torque shaft main body.

8. A fabricated torque shaft as in claim 7, wherein said input arm is detachably secured to said torque shaft main body.

9. A fabricated torque shaft as in claim 8, further comprising a receptacle for said input arm.

10. A fabricated torque shaft as in claim 1, wherein each said arm structure comprises a base and first and second side walls, each said side wall being disposed in a respective plane that is generally perpendicular to a plane of said base and perpendicular to a longitudinal axis of said torque shaft main body.

11. A fabricated torque shaft as in claim 10, wherein the side walls of at least two said arm structures have a generally corresponding shape.

12. A fabricated torque shaft as in claim 1, wherein one of said arm structures comprises an IGV arm, said IGV arm being detachably secured to said forward end of said torque shaft main body.

13. A fabricated torque shaft comprising:
  a torque shaft main body having a forward end and a rearward end;
  a first bearing being defined adjacent said forward end and a second bearing being defined at said rearward end of said main body;
  a plurality of arm structures provided at spaced locations along said torque shaft main body for operatively coupling said torque shaft to a plurality of vane stages of a compressor;
  at least one of said arm structures being detachedly secured to said torque shaft main body so that said at least one arm structure can be removed and replaced with another arm structure, wherein one of said arm structures comprises an IGV arm, said IGV arm being detachedly secured to said forward end of said torque shaft main body.

14. A fabricated torque shaft as in claim 13, wherein said forward end of said torque shaft includes a square coupling structure and wherein said IGV arm has a receptacle defined therein including a plurality of generally flat planar surfaces for respectively engaging flat planar surfaces of said square coupling.

15. A fabricated torque shaft as in claim 14, wherein said IGV arm is fixed to said square coupling with a screw and retainer assembly.

16. A fabricated torque shaft comprising:
  a torque shaft main body having a forward end and a rearward end;
  a first bearing being defined adjacent said forward end and a second bearing being defined at said rearward end of said main body;
  a plurality of arm structures provided at spaced locations along said torque shaft main body for operatively coupling said torque shaft to a plurality of vane stages of a compressor;
  at least one of said arm structures being detachedly secured to said torque shaft main body so that said at least one arm structure can be removed and replaced with another arm structure, wherein a plurality of said arm structures are detachably secured to said torque shaft main body, wherein said torque shaft main body includes a recessed receptacle for receiving each said detachable arm structure, wherein said recessed receptacles are machined in said torque shaft main body, and wherein said recessed receptacles are machined to respective different depths for each said detachable arm structure.

17. A fabricated torque shaft comprising:
  a torque shaft main body having a forward end and a rearward end;
  a first bearing being defined adjacent said forward end and a second bearing being defined at said rearward end of said main body;
  a plurality of arm structures provided at spaced locations along said torque shaft main body for operatively coupling said torque shaft to a plurality of vane stages of a compressor, said plurality of arm structures being detachedly secured to said torque shaft main body so that at least one said arm structure can be removed and replaced with another arm structure, wherein said torque shaft main body includes a recessed receptacle for receiving each said detachable arm structure; and
  a pin element disposed in at least some of said recessed receptacles for positioning said respective detachable arm structure therein,
  wherein said torque shaft main body has a generally rectangular cross-section along at least a substantial portion of a length thereof.

18. A fabricated torque shaft as in claim 17, wherein each said pin element is uniquely located in said respective receptacle and said respective arm structure includes a pin bore defined in a corresponding unique location whereby said respective arm structures can be received and engaged solely by said respective receptacle and pin element.

19. A fabricated torque shaft comprising:
  a torque shaft main body having a forward end and a rearward end;
  a first bearing being defined adjacent said forward end and a second bearing being defined at said rearward end of said main body;
  a plurality of arm structures provided at spaced locations along said torque shaft main body for operatively coupling said torque shaft to a plurality of vane stages of a compressor, said plurality of arm structures being detachedly secured to said torque shaft main body so that at least one said arm structure can be removed and replaced with another arm structure, wherein said torque shaft main body includes a recessed receptacle for receiving each said detachable arm structure,
  a pin element disposed in at least some of said recessed receptacles for positioning said respective detachable arm structure therein, and
  an IGV arm, said IGV arm being detachably secured to said forward end of said torque shaft main body.

20. A fabricated torque shaft as in claim 19, wherein each said pin element is uniquely located in said respective receptacle and said respective arm structure includes a pin bore defined in a corresponding unique location whereby said respective arm structures can be received and engaged solely by said respective receptacle and pin element.

* * * * *